SPIN ECHO INFORMATION STORAGE WITH FIELD VARIATION

Filed Aug. 9, 1954

INVENTORS
ARTHUR G. ANDERSON
JOHN W. HORTON
BY ROBERT M. WALKER
Van Deventer & Shively
ATTORNEYS

SPIN ECHO INFORMATION STORAGE WITH FIELD VARIATION

Filed Aug. 9, 1954

INVENTORS
ARTHUR G. ANDERSON
JOHN W. HORTON
BY ROBERT M. WALKER
Van Deventer & Shively
ATTORNEYS

SPIN ECHO INFORMATION STORAGE WITH FIELD VARIATION

Filed Aug. 9, 1954 5 Sheets-Sheet 3

INVENTORS
ARTHUR G. ANDERSON
JOHN W. HORTON
BY ROBERT M. WALKER
Van Deventer & Shively
ATTORNEYS Sept. 20, 1955 A. G. ANDERSON ET AL 2,718,629

SPIN ECHO INFORMATION STORAGE WITH FIELD VARIATION

Filed Aug. 9, 1954 5 Sheets-Sheet 4

INVENTORS
ARTHUR G. ANDERSON
JOHN W. HORTON
BY ROBERT M. WALKER
Van Deventer & Shively
ATTORNEYS INVENTORS
ARTHUR G. ANDERSON
JOHN W. HORTON
BY ROBERT M. WALKER
Van Deventer & Shively
ATTORNEYS United States Patent Office 2,718,629
Patented Sept. 20, 1955

2,718,629

SPIN ECHO INFORMATION STORAGE WITH FIELD VARIATION

Arthur G. Anderson, Riverdale, and John W. Horton, New York, N. Y., and Robert M. Walker, Closter, N. J., assignors to International Business Machines Corporation, a corporation of New York Application August 9, 1954, Serial No. 448,592

9 Claims. (Cl. 340—173)

The present invention pertains to improvements in spin echo technique with field variation.

An object of the invention is to provide a spin echo storage system which is free of unwanted or spurious echo effects.

A particular object is to provide a method of preventing the formation of spurious inter-pulse echoes by introduction of a continuous variation in field gradient, whereby the field symmetry conditions essential to such spurious formations are denied.

A further object is to provide suitable typical apparatus for carrying out the method.

Spin-echo technique in general comprises a method of storing information in the form of electrical pulses applied to samples of suitable chemical materials, and subsequently recovering the information as "echo" pulses produced by free nuclear induction.

The phenomenon of free nuclear induction per se has been set forth in Patent No. 2,561,489 to F. Bloch et al., as well as in various well-known scientific publications by Bloch and by Purcell. The extension of the effect to produce spin echoes, the work of E. L. Hahn, was described by the latter scientist in an article entitled "Spin Echoes," published in Physical Review, November 15, 1950. Since the above publications are readily available in the public domain, repetition herein of the entire complex mathematical analysis contained in them is unnecessary. However, in order to set forth most clearly the nature and advantages of the present invention, it is appropriate first to describe briefly the pertinent general principles of spin-echo technique. In this explanation, and the succeeding exposition of the present invention, reference is made to the accompanying drawings, in which:

Figures 16, 17:
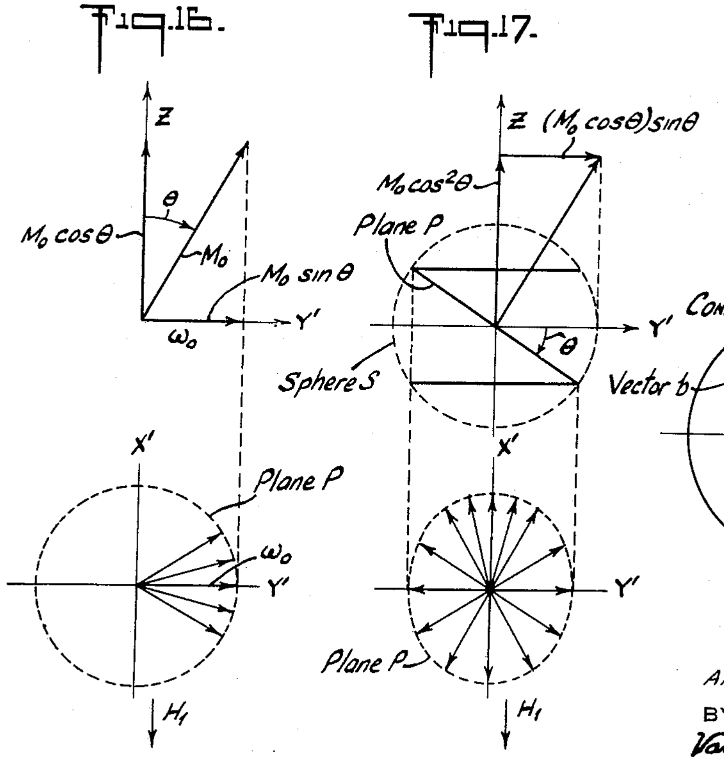
Figure 19:
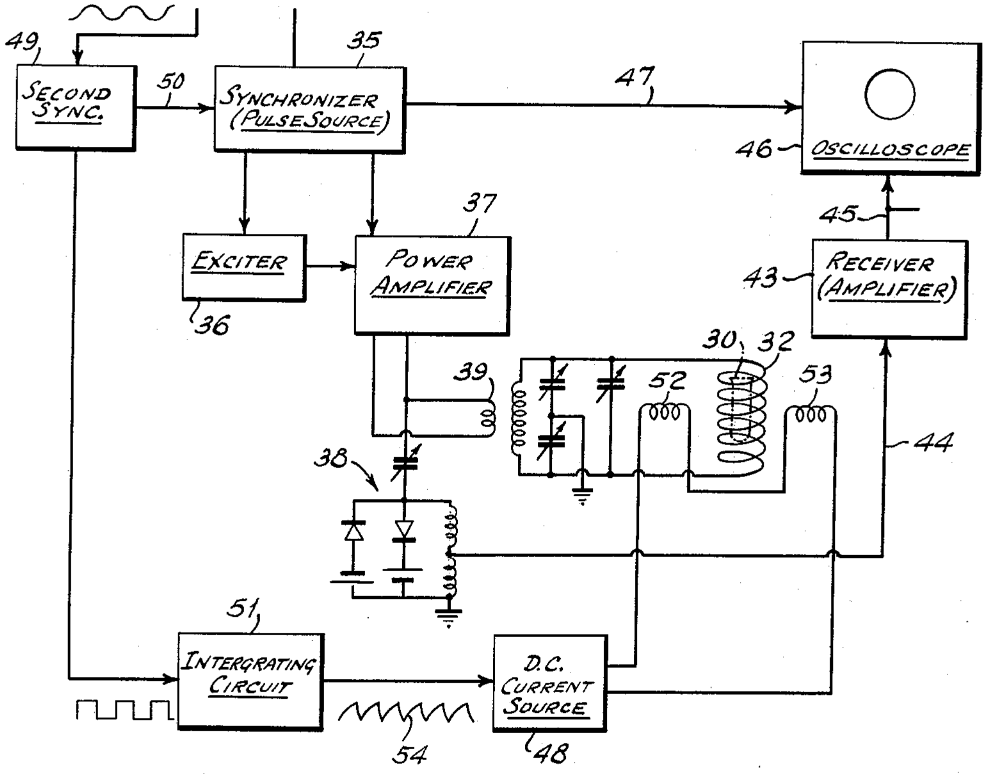
Figure 18:
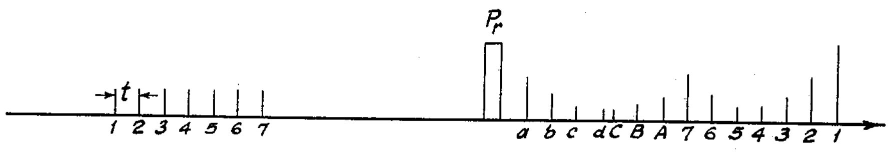
Figure 20:
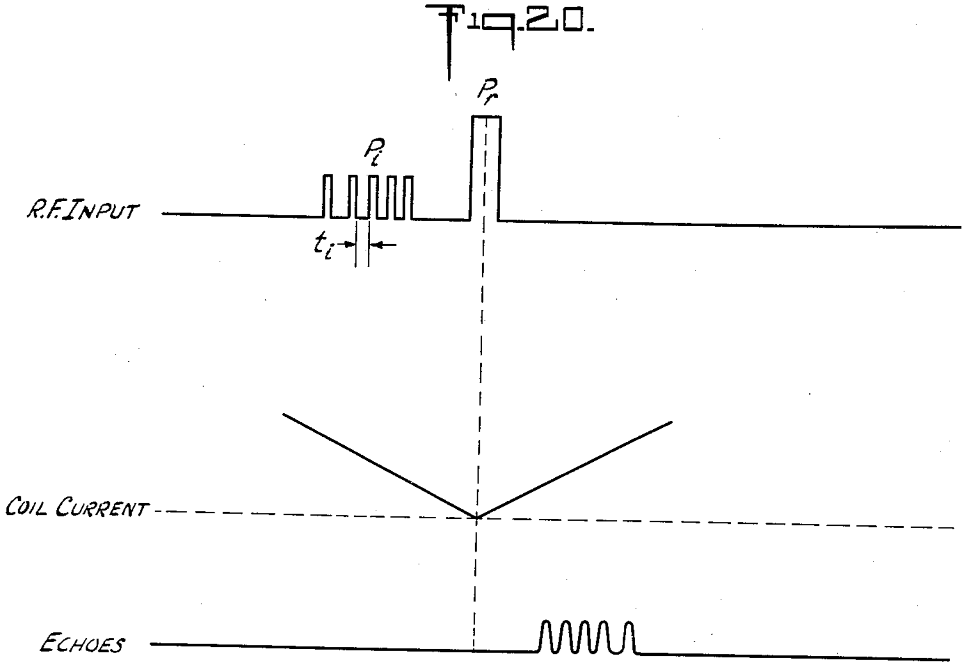
Figure 21:
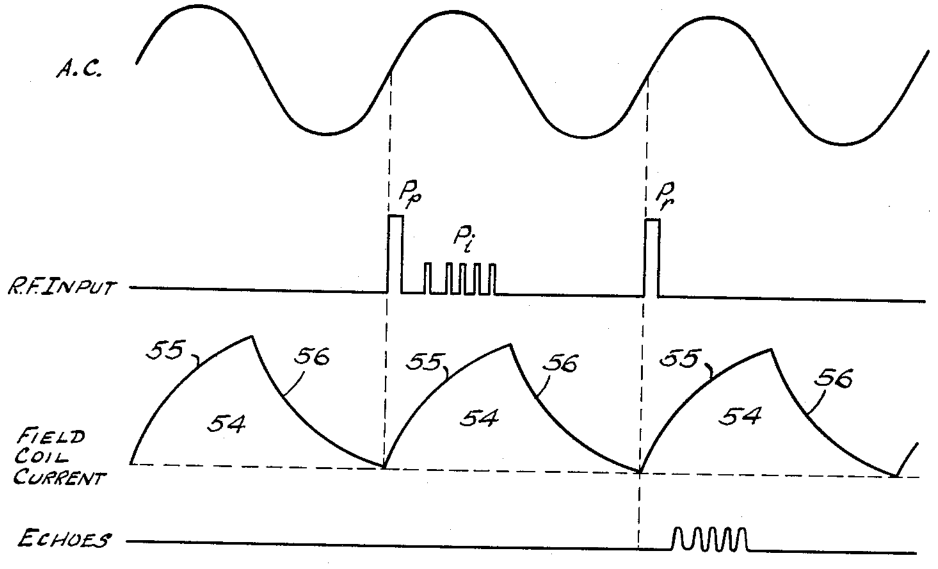

Figures 4, 5, 6, 7, and 8 illustrate diagrammatically the successive relationships assumed by nuclear magnetic moments throughout the production of mirror echoes;

Figures 9, 10, 11, 12, 13, 14 and 15 similarly illustrate successive moment relationships in stimulated echo production;

Figures 16 and 17 similarly represent moment behavior in multiple pulse storage and echo production;

Figure 18 illustrates the effect of spurious inter-pulse echoes on mirror-echo formation;

Figure 19 illustrates suitable apparatus for preventing spurious echoes by the method of the present invention;

Figure 20 is a time sequence diagram illustrating the application of field variation to mirror echo formation; and Figure 21 similarly illustrates the application of continuous field variation to a stimulated echo system.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0=\gamma H_0$, where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68\times10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments precessing at differing Larmor frequencies.

Figure 1:
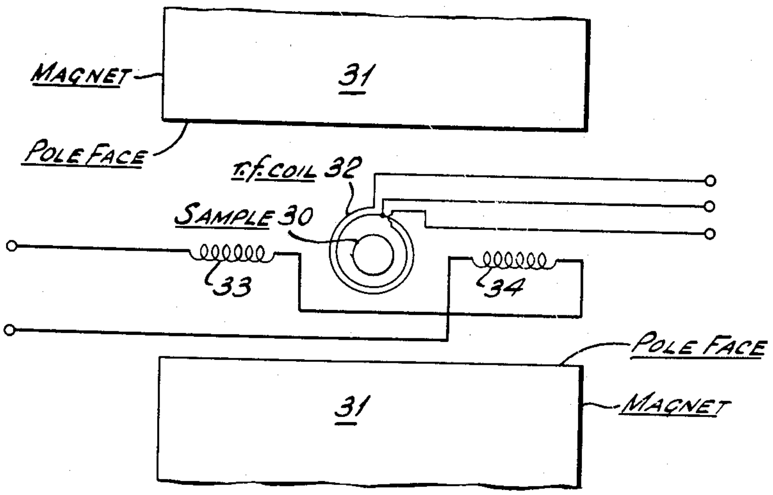
Figures 1 and 2 are joint diagrammatic illustrations of suitable apparatus for producing spin-echoes.

It is upon the above described characteristics of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electro-magnetic equivalent. The main magnetic field H exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, may be provided to regulate the inhomogeneity of the field $H_0$, as explained at length in co-pending application Serial No. 384,741, filed October 7, 1953, now Patent No. 2,700,147, or to introduce additional field inhomogeneities hereinafter set forth.

Figure 2:
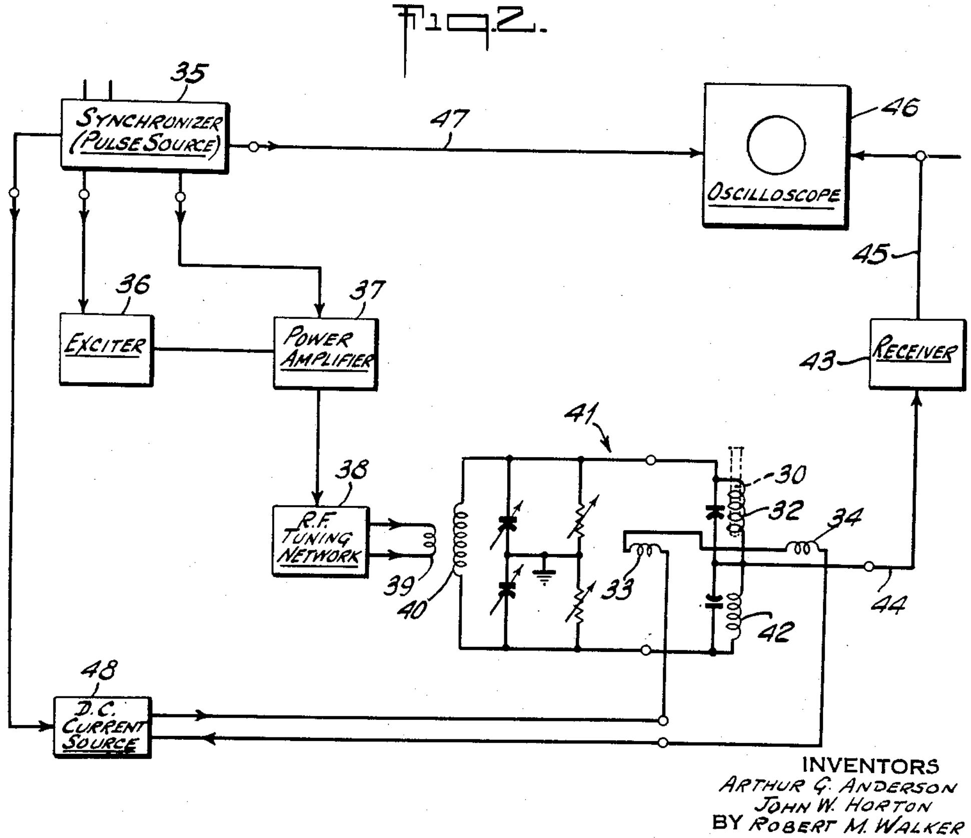

Figure 2 illustrates by semi-block diagram a typical electrical arrangement by which the impulses may be stored and echoes recovered from the sample 30. Inasmuch as the internal structures and modes of operation of the labelled block components are in general well known in the electronic art, description thereof will appropriately be limited to that necessary to explain the manner in which or with what modification they play their parts in carrying out the present invention.

A synchronizer or pulse generator 35 originates information and recollection pulses and other control pulses required by the system. The exciter unit 36, controllable by the pulse source 35 and comprising an oscillator and a plurality of frequency doubling stages, serves as a driving unit for the R. F. power amplifier 37. In the production of a pulse the source 35 first energizes the exciter 36 to place an R. F. driving signal on the amplifier 37, then "keys" the amplifier to produce an output signal therefrom. This output is routed via a tuning network 38 to a coil 39 which is inductively coupled to a second coil 40 adapted to supply energy to a bridge circuit network 41. One leg of the bridge circuit comprises the previously described R. F. coil 32, Fig. 1, while a second R. F. coil 42, identical with coil 32, forms the second or balancing leg. A signal amplifier or receiver 43 has its input conductor 44 connected to the network 41 between the coils 32 and 42. The output 45 of the amplifier 43 is directed to suitable apparatus for utilization of the echo pulses, such apparatus being illustrated herein by an oscilloscope 46 provided with a horizontal sweep control connection 47 with the synchronizer 35.

The sample 30 is contained within the R. F. coil as indicated. From the balanced bridge arrangement shown, it will be evident that R. F. pulses introduced via the coil 40 energize the coils 32 and 42 equally, so that while the sample 30 receives the desired input pulses, the centrally connected conductor 44 carries but little R. F. power to the amplifier 43. By this means, the sample 30 may be subjected to heavy R. F. power pulses without unduly affecting the signal amplifier. However, echo pulses induced by the sample 30 affect only the coil 32, so that by unbalance of the bridge such pulses are applied to the amplifier 43 as desired.

A D. C. current source 48, controllable by the synchronizer 35, is adapted to supply current to the coils 33 and 34 for field inhomogeneity regulation as previously noted.

In initiating spin-echo effects, the sample 30 is first subjected to the steady magnetic field $H_0$ for sufficient time to allow its gyromagnetic nuclei to become aligned as previously described. The sample is then subjected to two or more pulsed applications of an alternating magnetic field $H_1$, produced by R. F. alternating currents in the coil 32 and hence normal to the main field $H_0$. After a quiescent period the sample develops spontaneously a magnetic field of its own which is also normal to $\overline{H}_0$ and which rotates around the latter's direction. The strength of this rotating field builds up to a maximum and then decays, and if it is picked up inductively by a properly oriented coil (i. e., the coil 32), amplified and detected, it appears as an electrical pulse. This pulse is termed an "echo" of one of the previous pulses of the alternating magnetic field $H_1$, being directly related thereto as hereinafter explained.

Figure 3:
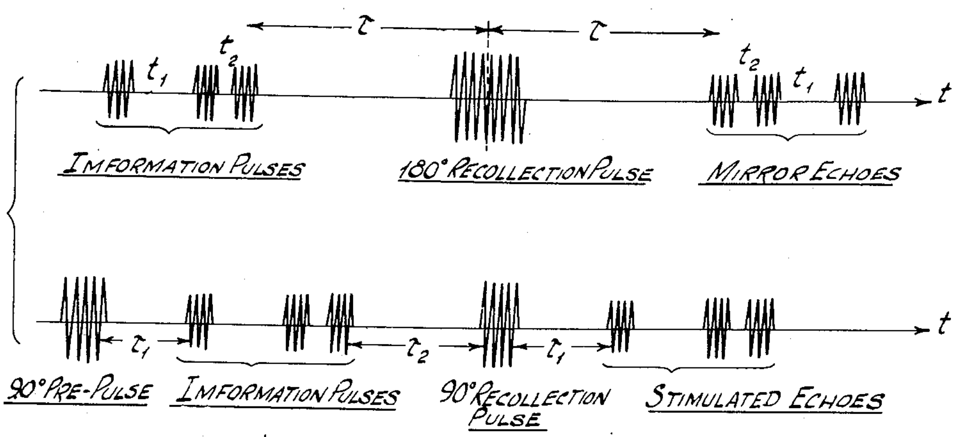
Figure 3 is a double time-sequence graph illustrating the distinction between mirror echo and stimulated echo effects.

Figure 3 illustrates two important ways of pulsing the field H on and off when the combination is to be used as a memory device. In this connection certain suggestive names have been assigned to the various pulses, as shown on the diagram. The "echoes" are always considered to be distinctive echoes of the "information" or entering pulses. The "recollection" pulse is so called because it is applied whenever it is desired to obtain echoes of the information pulses, which latter are said to have been "stored" or "remembered" prior to the recollection pulse. As will be explained subsequently, echoes occur for physically differing reasons, and are thus properly distinguished as to type by different names. Two types illustrated are "mirror echoes" and "stimulated" echoes, these two types being associated with two distinct time symmetries in the operative cycle.

In Figure 3 the ordinate represents the voltage across the terminals of the R. F. coil 32 containing the sample, while the abscissa represents time. In order to make illustration feasible, the echo pulses have been drawn $10^5$ times larger than they would be on a scale of the ordinate which is suitable for drawing the information and recollection pulses. The duration of each information pulse may be of the order of a few microseconds, whereas the times $\tau$, which are the "memory" of "storage" intervals, may be for example of the order of seconds when water is used as a storage medium comprising the sample 30.

It will be seen that in the figure for mirror echoes the echo pulses and information pulses have mirror symmetry with respect to the center of the recollection pulse, $\tau$ being the memory time which can have any value from a few microseconds to several seconds.

In the case of stimulated echo production a "pre-pulse" precedes the introduction of the information pulses by time interval $\tau_1$, while the stimulated echo pulses follow the recollection pulse by the same interval $\tau_1$, and in the same order in which their corresponding information pulses were entered. Thus the figure for stimulated echoes has "translational" rather than mirror symmetry. The interval $\tau_2$ is the memory time, and has the same range as $\tau$, previously mentioned. Since $\tau_1$ can be made arbitrarily small, it is evident that stimulated echoes can be made to appear immediately after recall, and as noted above, they appear in the same order as the corresponding information pulses.

While the infinitely numerous individual inter-relationships among gyromagnetic nuclei lie in the field of quantum mechanics and obviously cannot be directly depicted, their macroscopic resultant effects employed in spin echo technique lend themselves to illustration by simplified mathematical models. To further clarify the difference between "mirror" echoes and "stimulated" echoes, the production of these two types will be described separately as follows:

*Mirror echoes*

Figure 4:
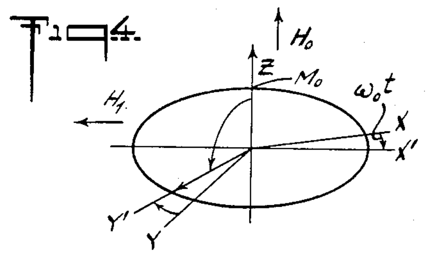

Referring to Figure 4, it will be seen that the diagram presents a three-dimensional geometric figure having a vertical Z-axis and X and Y-axes defining a plane normal thereto. The Z-axis represents the direction of the main magnetic field $H_0$ affecting the sample 30. In the case of $H_0$ and other symbols herein, it will be understood that the bar over the letter indicates the average value.

When the sample 30 has been subjected to the sole influence of the field $\overline{H}_0$ for sufficient time to align its spinning nuclei as previously described, a resultant or combined magnetic moment vector $\overline{M}_0$ exists in the Z or $\overline{H}_0$ direction.

An oscillatory field $2H_1 \cos \bar{\omega}_0$ is applied to the sample 30 at right angles to $\overline{M}_0$ by means of the R. F. coil 32, this application comprising an "information" pulse, Fig. 3. At each point of the sample the linear oscillating magnetic field $2H_1$ may be resolved into two component vectors of constant magnitude $H_1$ which rotate in opposite directions with angular velocity $\omega_0$. Due to the unidirectional spin of the nuclei whose magnetic moments make up the vector $\overline{M}_0$, the latter is conditioned to precess about $H_0$ in one direction. The R. F. field component which rotates in the precessional direction of $\overline{M}_0$ exerts a couple thereon which is constant in time, whereas the time average of the couple exerted by the other component is zero. The effect of the constant couple exerted by $\overline{H}_1$ on $\overline{M}_0$ is to tip $\overline{M}_0$ away from $\overline{H}_0$ through an angle $\theta = \gamma H_1 t$, where $t$ is the duration of the R. F. pulse. For illustration, in Fig. 4 the angle $\theta$ is taken as 90°; so that $\overline{M}_0$ is rotated into the XY plane.

The direction initially assumed in the XY plane of $\overline{M}_0$ is designated in Fig. 4 by Y′, with accompanying X′ at right angles thereto. Since $\overline{M}_0$ is revolved synchronously by the R. F. field, the R. F. plane may be considered as revolving with the radian frequency $\overline{\omega}_0$. As will shortly appear, the echo effects produced are the results of changes in the relative angular directions of moment vectors in the revolving X′Y′ field, so that the Y′ axis, while actually revolving, is conveniently represented in the drawings as a stationary reference to make clear the nature of these relative changes.

At the termination of the R. F. information pulse the moments making up the vector $\overline{M}_0$ begin to precess about $\overline{H}_0$ at their own characteristic Larmor frequencies. However, since $\overline{M}_0$ is made up of the moments of gyromagnetic nuclei existing in different parts of the sample 30 and therefore influenced by differing strengths of the inhomogeneous magnetic field $\overline{H}_0$, these constituent moments precess at differing Larmor frequencies, as previously explained. Thus while the entire X′Y′ system continues to rotate, the vector $\overline{M}_0$ no longer revolves therewith as a unit, but splits into constituents such as vectors *a* and *b*, Figure 5, having respectively greater and smaller angular velocities than a vector *c*, which latter has exactly the X′Y′ plane rotational frequency $\overline{\omega}_0$. Thus, considering *c* as the vector of relatively stationary reference, it will be seen that vectors of higher precessional frequencies such as *a* draw away from *c* in one direction, while those of lower frequencies such as *b* draw away from *c* in the opposite direction. So long as this rotational divergence continues, the distribution of the various revolving moments in the X′Y′ plane is such that they cannot come into coincidence so as to form an effective resultant moment.

Figure 5:
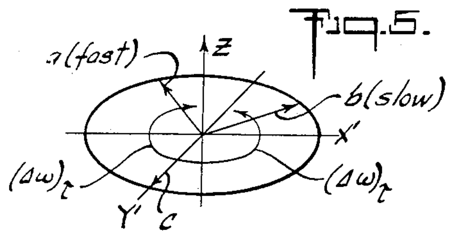
Figure 6:
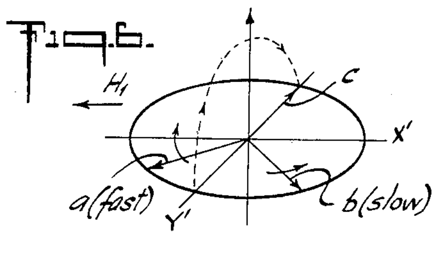
Figure 7:
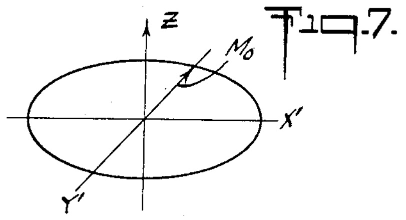
Figure 8:
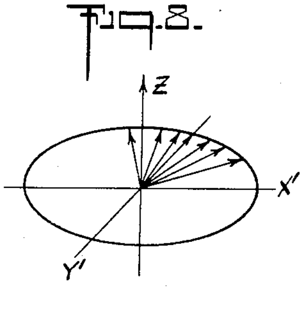

After a length of time $\tau$, assuming the moment vectors *a*, *b*, and *c*, to have assumed the relative positions shown in Fig. 5, they are subjected to another R. F. pulse of longer duration than the first, this pulse comprising the "recollection" pulse, Fig. 3. The effect of this pulse is to rotate the vectors through 180 degrees about the X-axis, that is, the X′Y′ plane is flipped or "pan-caked." This action brings the various vectors into the positions shown in Fig. 6, their relative orientations being in mirror relation to those of Fig. 5. Since the vectors continue to precess in their original directions, it will be evident that *a* and *b* now converge toward *c* at the same rates at which they formerly diverged therefrom. Consequently, after a second time interval $\tau$ all the "fast" and "slow" vectors, represented by *a* and *b*, again come into coincidence with *c*. By this convergence the various moments reinforce each other to recreate a net magnetic moment $\overline{M}_0$ in the X′Y′ plane, Fig. 7. Since $\overline{M}_0$ is rotating with angular velocity $\overline{\omega}_0$ relative to the coil 32, a signal is induced in this coil which is the "echo" of the first or "information" pulse applied to the sample. After the vector components of $\overline{M}_0$ attain the condition of coincidence, still precessing at their differing Larmor frequencies, they pass and spread out again as shown in Fig. 8, so that the echo signal dies out. The larger number of vectors in Fig. 8 are illustrative of the point that while for clarity in explanation only token vectors *a*, *b* and *c* were drawn in Figs. 5 and 6, the effect actually involves a huge number of such interacting moment vectors.

The foregoing explanation has demonstrated mirror spin-echo formation in the simplest case, i. e., the formation of a single echo of a single information pulse. Obviously the useful application of the technique normally involves multiple impulse storage and extraction, as illustrated in Fig. 3, but as this phase of the technique contains factors common to both mirror and stimulated echo production, it is appropriate that a brief description of stimulated echoes per se be inserted at this point.

*Stimulated echoes*

Figure 9:
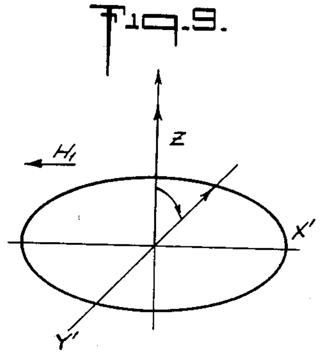
Figure 10:
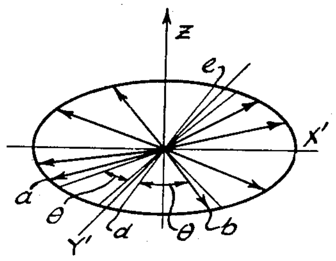

The "mirror echoes," just described, will be seen to occur when magnetic moment vectors which have been rotating in the XY plane are made to re-assemble in that plane. Thus it may be stated that the information is "stored in the XY plane." Information may also be stored along the Z-axis, in the following manner:

Referring to Fig. 9, somewhat similar to Fig. 4, the net magnetic moment $\overline{M}_0$ is tipped or rotated into the XY plane by a radio-frequency pulse of suitable strength and duration. This, however, is not an information pulse as applied in the former case, but the "pre-pulse" shown in the lower curve of Fig. 3. After the pre-pulse the differentially precessing constituent vectors of $\overline{M}_0$ spread around the XY plane and cover it more or less uniformly, as shown in Fig. 10.

After a time $\tau_1$ has elapsed, a second R. F. pulse (the "information" pulse) is applied. Just before this pulse, let us consider bundles of vectors labelled *a*, *b*, *d*, *e*, shown in Fig. 10. The bundle *a* itself contains individual vectors differing in precessional frequency in such a way that after having made one or more revolutions in the X′Y′-system they have arrived at the position shown. If the directions of each vector within bundle *a* were reversed at the instant shown in Fig. 10, they would all re-assemble at the position of $\overline{M}_0$ in Fig. 9.

Figure 11:
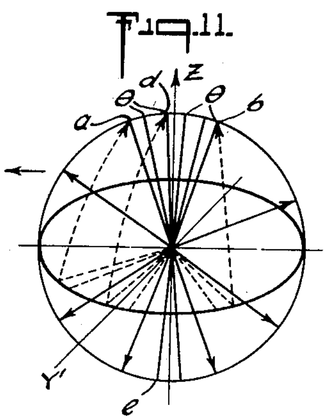
Figure 12:
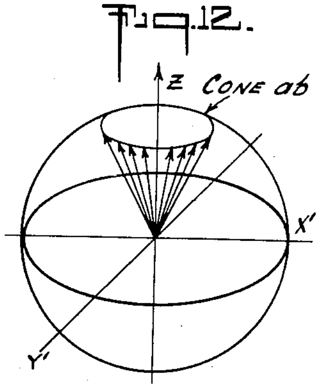

In the present illustration, the information pulse rotates all the vectors in the XY-plane through 90° about the X′-axis as shown in Fig. 11. From their positions as shown in Fig. 11, at the termination of the information pulse, the vectors of bundles *a* and *b* start precessing about the Z-axis with the different frequencies which they represent. They thus spread over the surface of a cone *ab* about the Z-axis as shown in Figure 12.

Figure 13:
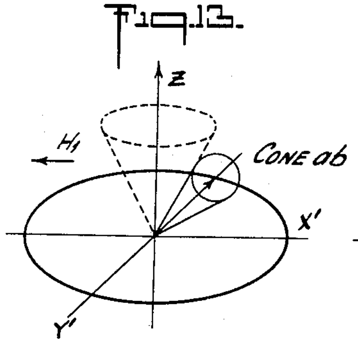
Figure 14:
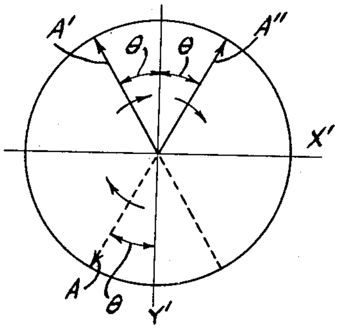

Still carrying out the simplest case of producing a single stimulated echo from a single information pulse, after an arbitrary period of time a third or "recollection" R. F. pulse is applied. This pulse rotates the axis of the cone *ab* into the X′Y′-plane as shown in Fig. 13. The significant fact at this stage is that all vectors of bundles *a* and *b* lie on the cone *ab*. They therefore start to re-assemble from angular positions which are not much different from the mirror image of the positions they had immediately prior to the application of the information pulse. This circumstance is illustrated in plan view in Fig. 14 for a particular vector A of the bundle *a*. Thus if the vector A is rotated into position A′ it will assumedly return to the Y′-axis. Due to its movement on the cone it may return from A with the headstart $2\theta$. In the aggregate, the pulsed rotation of 180° about X′ in going from the condition of Fig. 10 to that of Fig. 12 is equivalent to reversing the directions of rotation of all the vectors.

Figure 15:
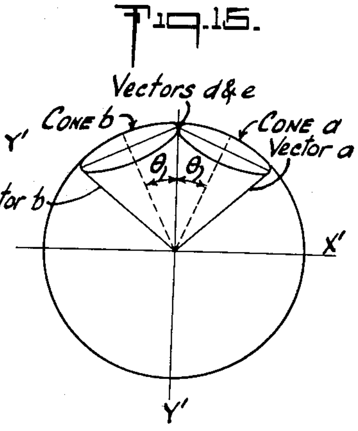

After the period of time $\tau_1$, subsequent to the recollection pulse, the vectors of bundles *a* and *b* will have reassembled approximately as shown in Fig. 15. Vectors of bundle *a* will be upon the surface of the cone *a* and those of *b* will be on the surface of cone *b*. The total component along the Y′-axis is proportional to the projection of the constituents of cone *a* or *b* on its axis multiplied by the projection of this axis on the Y′-axis, that is to $\cos^2\theta$. Since cos 90° is zero, those bundles similar to *a* and *b* for which $\theta = 90°$ give no net component. Since this is the largest value of $\theta$ which need be considered, (for $$\theta > \frac{\pi}{2}$$

$\theta$ is replaced by $(\pi - \theta)$ and the same results hold), it is evident that the component along the Y′ axis is never negative; hence a net must exist as the moments reassemble, and a "stimulated" echo signal appears. In contrast to the previously described XY plane storage in the case of a "mirror" echo, it will be seen that storage of the information in the present case prior to the recollection pulse was in the Z-direction, so that it may properly be designated as "Z-storage" or "Z-axis storage."

*Multiple-impulse storage*

The foregoing two sections having described how a single pulse of R. F. energy may be stored for periods of time, which may be for example as short as a few microseconds or as long as seconds, Figs. 16 and 17 illustrate the manner in which multiple pulses may be stored.

In the case of a single information pulse to produce a single echo by for example the mirror method as described, the angle $\theta$ through which the moment vector $\overline{M}_0$ was tipped by the R. F. information pulse was taken at the optimum value of 90°, bringing $\overline{M}_0$ into the XY-plane in a single operation. However, if the tipping angle $\theta$ be made less than 90°, it will be evident that $\overline{M}_0$ and consequently its component vectors nevertheless have their components in the XY-plane, which components may be utilized for echo production.

For purposes of analysis, let it be assumed that the sample 30 of material perfectly remembers a single pulse of information for a certain period of time, say $2T_r$, and then forgets. Consider that N echoes are to be produced during the time $T_r$. The maximum time for inserting information, if all the information is to be recalled, is then the first period $T_r$.

The process of conditioning the device to generate these N echoes is shown in Figs. 16 and 17 for the first and second pulses, the showing of course being a necessary illustrative simplification of the complex actual behavior of the physical materials, as previously pointed out. The first pulse tips $\overline{M}_0$ by the angle $\theta$ so that the moment $\overline{M}_0$ sin $\theta$ appears in the X′Y′ plane. The corresponding echo will then be proportional to $\overline{M}_0$ sin $\theta$. Following the termination of the first information pulse, in a period of time equal to one-half the duration of the subsequent echo, component vectors of $\overline{M}_0$ will have spread out over the X′Y′-plane so that no net vector exists in any direction, the lower plan view portion of Fig. 16 illustrating this spreading in progress. In illustrating a situation in which $\overline{M}_0$ first is tipped without spreading and then subsequently spreads it will be assumed that the subsequent echo is to be considerably longer than the duration of the information pulse.

The effect of the second pulse, illustrated in Fig. 17, is to rotate the plane P containing the vectors of the first pulse out of coincidence with the X′Y′ plane by the angle $\theta$ about the X′ axis. The vectors of this plane P spread over the surface of a segment of a sphere S, but all retaining projected components in the X′Y′-plane. Since the net component of these vectors along the Z-axis is zero, the second pulse also produces the component ($\overline{M}_0$ cos $\theta$) sin $\theta$ in the X′Y′ plane, setting up a second "family" of vectors in the latter plane for subsequent production of the second echo.

In the same manner, each additional information pulse, while establishing its "family" of effective vectors, at the same time affects the amplitude of those already entered. This relationship, which is a prime factor in determining the storage capacity of a spin-echo system, may be analyzed briefly as follows:

The sum of the lengths of the projections in the XY plane of the vectors in plane P is for small $\theta$, proportional to $$\cos \frac{\theta}{\sqrt{2}}$$

With N information pulses, the echo amplitudes $E_1$; $E_2$ . . . for the first, second, etc. information pulses will be $$E_1 = k\overline{M}_0 \sin \theta . \cos^{N-1} \frac{\theta}{\sqrt{2}}$$

$$E_2 = k\overline{M}_0 \cos \theta . \sin \theta . \cos^{N-2} \frac{\theta}{\sqrt{2}}$$

$$E_m = k\overline{M} \cos^{m-1} \theta . \sin \theta . \cos^{N-m} \frac{\theta}{\sqrt{2}}$$

Then for small $\theta$, the function $E_m$ is a maximum for $$\theta_m = \sqrt{\frac{2}{N+m}}$$

From the above equation for $E_1$ it can be seen that if $N=1$, a maximum E is obtained by having $\theta = 90°$, the optimum angle used in the previous explanation of single echo formation, Fig. 4. Thus calling this maximum echo amplitude $E_1$, we have $$\hat{E}_1 = k\overline{M}_0$$

If the $m$th pulse is maximized other pulses obviously will not be a maximum. A good choice for $\theta$ is to maximize the Nth pulse, that is to choose $$\theta = \sqrt{\frac{1}{N}}$$

Then, for small $\theta$ and large N, $$\text{Max } E_N \approx \hat{E}_1 \frac{1}{\sqrt{N}} \left(1 - \frac{1}{2N}\right)^N \approx \hat{E}_1 \left(\frac{1}{e^{1/2}\sqrt{N}}\right) = \hat{E}_1 \left(\frac{0.6}{\sqrt{N}}\right)$$

With this value of $\theta$ the first pulse is $$E_1 \approx \hat{E}_1 \frac{1}{\sqrt{N}} \left(1 - \frac{1}{4N}\right)^N \approx \hat{E}_1 \left(\frac{1}{e^{1/4}\sqrt{N}}\right) = \hat{E}_1 \left(\frac{0.78}{\sqrt{N}}\right)$$

Thus, as additional pulses are entered in the storage time $T_r$, the maximum echo amplitude falls off as $$\frac{1}{\sqrt{N}}$$

By derivation similar to the foregoing, it may be shown that substantially the same condition applies in the case of stimulated as in mirror echo techniques.

In order to set forth most clearly the distinctive formation of mirror type and stimulated echoes, these phenomena necessarily have been described separately in their idealized or pure state, that is, as though each type of echo process were carried out without any presence of the other, and as though each information pulse and its echo were an externally unaffected combination. However, since as previously pointed out, the actual physical phenomena involve the inter-relationships among countless spinning nuclei, the effects described comprise what may be termed the dominant resultant manifestations, but are by no means the only effects present. Thus, while storing information pulses primarily for mirror echo production, secondary or partial Z-axis storage also occurs, and similarly, storage primarily for stimulated echo production may be accompanied by secondary partial mirror-echo effects. It will be obvious that such unwanted echo effects, if not eliminated, must exercise a deteriorating influence on the production of the predominant or desired echoes.

In practice, with multiple information pulse entry and echo formation, a limitation on the practical number of pulses may be set by the production of spurious echoes due to inter-pulse effects which raise the previously mentioned "noise level" of the system and affect the amplitude of the desired echo pulses. These inter-pulse effects are largely a result of the action of each information pulse after the first upon the pulses which preceded it.

When information entries are supplied to the device as a train of pulses, each information pulse after the first acts also as a semi-recollection pulse and generates echoes. If many such inter-pulse echoes occur simultaneously with some desired echo, the amplitude of the net voltage signal is greatly reduced from that which would result from the desired echo alone. This is particularly the case for equal pulse spacing in the information train, and is illustrated in Figure 18, in which it is desired to produce mirror echoes 7, 6, 5, 4, 3, 2 and 1 from corresponding information pulses 1, 2, 3, 4, 5, 6, and 7. The presence of inter-pulse echoes is shown at *a*, *b*, *c*, and *d*, etc.

Such spurious echoes fall generally into three categories. Class I arises as a result of partial read-out by the recollection pulse of the Z-axis storage caused by each information pulse acting on each previous pulse. The strength of each such stored element is therefore proportional to $\sin^2 \theta_i$ where $\theta_i$ is the angle or tip caused by the information pulse. This read-out appears, as shown, as a set of stimulated echoes *a*, *b*, etc. following the recollection pulse, each at an interval determined by the spacing between the two causative pulses.

For example, with pulse spacing $t$ and $t_r$ the time of the recollection pulse, at time $(t_r+t)$ there will be a composite echo caused by those pairs 1—2, 2—3, 3—4, etc.; with N pulses there will be $(N-1)$ of these pairs. With constant frequency in the R. F. input there spurious echoes add, and if the recollection pulse causes a nutation of $\theta_r$, the resultant spurious echo at $(t_r+t)$ is proportional to $(N-1) \sin^2 \theta_i \sin \theta_r$. Similarly it follows that the spurious signal at $(t_r+kt)$ will be proportional to $(N-k) \sin^2 \theta_i \sin \theta_r$, where $k \leqq N$. Hence these echoes decrease with time and vanish at $(t_r+kt)$. However, it will be evident that if the information pulse train occupies more than half the total time interval between the first pulse and the recollection pulse, the above described Class I spurious echoes intrude into the desired echo interval and cause interference.

Second and third classes of spurious echoes arise from substantially the same cause described above, i. e., a stimulated inter-pulse echo is produced by every combination of three information pulses and has a strength proportional to $\sin^3 \theta_i$. These stimulated echoes are then "flipped" throughout 180° by the recollection pulse; this causes a mirror echo of the inter-pulse stimulated echoes (Class II), and also results in a second following set of echoes, Class III, which is in effect a repetition of the Class II inter-pulse echoes.

It thus will be seen that the intrusion of inter-pulse echoes produces undesirable effects as previously noted, not only by producing unwanted echoes themselves but also by reducing the amplitude and uniformity of the desired echoes, as illustrated in simplified form in Fig. 18; in other words, the signal to noise ratio of the system is reduced. Without unnecessary further specific description, it will be evident that inter-pulse echoes also arise in the production of desired stimulated echoes, with similarly disadvantageous results.

The present invention provides a method of preventing the formation of such spurious inter-pulse echoes by a continuous field gradient variation. Figure 19 illustrates schematically a typical set of apparatus for carrying out the improved technique. In this device the entry of the R. F. information pulses, recollection pulse and pre-pulse, and the output of the echoes, are carried out in substantially the same manner as previously described with respect to Figure 2, except that in the present illustration the echo pulses are transmitted inductively back through the coil 39, thence via the network 38 and the lead 44 to the amplifier 43.

A second synchronizer 49, connected to a source of alternating current, has a triggering connection 50 to the main synchronizer or pulse source 35, being adapted to trigger the latter in predetermined synchronous ratio with the alternations of the current source, for example at every eighth cycle thereof, to initiate the information and echo cycle. For convenience the primary A. C. frequency may be illustrated as standard 60 cycle, but it will of course be understood that other frequencies may be used if desired.

The second synchronizer 49 also converts the primary A. C. to a square wave, the latter being transmitted to an integrating circuit 51 which controls the direct current source 48. The output of the source 48 is supplied to a pair of magnet coils 52 and 53, connected so that their fields oppose. These coils are arranged orthogonally to the axis of the coil 32 containing the sample 30 and also to the direction of the field $H_0$ of the magnet 31, Fig. 1, the latter main magnet being understood to be present but not drawn in Fig. 20, to avoid unnecessary three-dimensional complication in illustration. Thus coils 52 and 53 receive current varying in a wave-form 54, for example having an upwardly convex rise and an upwardly concave fall, and consequently produce corresponding inhomogeneity variations in the magnetic field affecting the sample 30. These field changes produce effective changes in the Larmor frequency relationships of the spinning nuclei, which changes may be utilized to destroy unwanted echoes as follows:

From the earlier explanation of the manner in which related moment vectors re-assemble to generate spin-echoes, it is evident that for such echoes to form it is necessary that magnetic field conditions which govern the Larmor precessional frequencies of the various vector components set in operation by each information pulse must have been, in cumulative effect, reproduced at the time the echo is to be formed, i. e., in the case of mirror echoes $\int idt$ between the information pulses and the recollection pulse must equal $\int idt$ between the recollection pulse and the echoes, where $i$ denotes the current through the coils 52 and 53 and is thus indicative of the variation in field condition produced thereby. Thus, since mirror echoes have mirror symmetry about the recollection pulse, as previously explained, it follows that field variation also having mirror symmetry with respect to the recollection pulse will result in the desired echoes.

Stimulated echoes, also as pointed out previously, follow each other directly after their recollection pulse in the same order and spacing as their originating information pulses had with respect to the pre-pulse, i. e., they have translational symmetry. For such echoes to form in a varying field, therefore, it is sufficient that $\int idt$ between the pre-pulse and the information pulses be equal to $\int idt$ between the recollection pulse and the echoes, and if the effect of such "integral" symmetry is denied, obviously the echoes will not be formed.

The same integral symmetry conditions for echo formation apply to spurious echo storage as in the case of the desired main echoes. It will accordingly be evident that if a continuous change in field inhomogeneity condition be maintained in such a manner as to provide the required symmetry for the wanted echoes while denying such symmetry to spurious storage, the unwanted echoes otherwise arising from the latter will be inhibited while the desired echoes will be preserved.

Figure 20 illustrates field variation in the simplest case of mirror-echo production, in which the current through the coils 52—53, and hence the field variation, are taken as decreasing and subsequently increasing symmetrically about the recollection pulse $P_r$. Since the information pulses $P_i$ are entered primarily in XY-plane storage, the mirror symmetry about the recollection pulse fulfills the noted condition for mirror echo production, and the mirror echoes accordingly appear as shown.

Respecting the previously described potential spurious echo formation, however, the following effects occur:

Type 1 inter-pulse echoes would normally be read out of Z-axis storage directly after the recollection pulse $P_r$, and are destroyed for lack of translational field symmetry, i. e., they encounter field variation conditions differing not only in direction but also in time relationships from their original formation conditions.

Each type 2 inter-pulse echo spends some time (at least $t_1$) along the Z-axis before it is read out by a following information pulse (acting as a recollection pulse). Because the field is not properly symmetrical with respect to the information pulse combination, type 2 is destroyed insofar as its echoes both before and following the recollection pulse are concerned. Type 3 normally arises from type 2 as previously noted, and because it was stored for at least time $t_1$ along the Z-axis, it does not encounter the requisite field symmetry on both sides of the recollection pulse and is also destroyed. It will furthermore be evident that any inter-pulse echo effect arising from the action of two or more information pulses, would have to develop in a time relation after the recollection pulse different from that of the echo of its originating pulse and would accordingly be destroyed.

In the case of the stimulated echo type of operation, which, due to its characteristic of echo formation in the same order as information entry, may be in general preferred over the mirror type for useful application, two conditions leading to optimum operation consist in preserving effective translational symmetry conditions respecting the desired echoes themselves while denying such condition to inter-pulse Z-axis storage effects; a third condition is to destroy any spurious XY plane storage by denial of effective mirror symmetry. The manner in which the present invention provides the above three conditions is illustrated in Figure 21.

Referring to Figure 21, in which the upper curve represents the A. C. supply to the second synchronizer 49, the current through the field coils 52 and 53 has the characteristic wave-form 54 indicated in Fig. 19, the rising slope 55 of the wave being of upwardly convex shape, in contrast to the upward concavity of the falling curve 56 following the peak. To start the echo cycle, the second synchronizer 49 triggers the synchronizer 35 so as to initiate the pre-pulse $P_r$ at the beginning or low point of a wave 54, thereby conditioning the nuclear moments of the sample 30, Fig. 1, to receive Z-axis or "stimulated echo" storage. The R. F. information pulses $P_I$ are applied during the rise 55 of the field coil current, thus being entered under the field variation condition corresponding to this rising current.

The recollection pulse $P_r$ is applied at the beginning of a following wave 54, that is in a position of translational field symmetry with respect to the pre-pulse $P_p$. Since the slopes 55 of the two waves 54 are identical, the condition of translational symmetry in field variation in relation to the pre-pulse and recollection pulse is maintained as required for stimulated echo production, and these desired echoes accordingly appear as shown. In the case of any tendency to spurious inter-pulse echo formation, however, the conditions are different. Since as previously explained these effects arise from interaction among the information pulses themselves in groups of two, three, etc., it will be evident that for such echoes to form there must exist within and immediately following the information pulse period the same effective conditions of field and time symmetries as those applying to the main pulses of the desired echo cycle. Thus for an information pulse to act as a recollection pulse and generate an echo from one or more previous information pulses, the latter's storage must have encountered the same effective field-time conditions following the "local" recollection pulse as during the time it was previously in XY plane storage.

For lack of essential symmetry, in the field condition, Fig. 21, no such spurious echoes can be formed from XY-plane storage; in fact, due to the asymmetrical shape of the waves 54, it will be evident that no effective mirror symmetry can exist anywhere in the system, so that no mirror echoes can form from any source of storage while such a wave form is employed. Similarly, incipient interpulse echoes from spurious Z-axis storage, which echoes normally would form immediately after their "local" recollection (information) pulses in the manner of stimulated echoes, are denied the requisite effective translational symmetry by the continuous variation in field condition, and are consequently destroyed or prevented from forming.

From the foregoing description it will be seen that the present invention, by the introduction of continuous field variation throughout a spin echo cycle in timed relation thereto, provides a method of effectively preventing the formation of spurious echoes while producing desired echoes in their purest and hence most useful state. Obviously the precise relationships and wave-forms shown have been used merely for illustration, and may be modified in various ways while operating in substantially the same manner. For example, for production of desired mirror echoes the integrating network 51 may be adjusted to put out a triangular wave form making possible the conditions illustrated in Fig. 20. Similarly, the echo cycle was described as triggered for example at every eighth cycle of the A. C. current source, but obviously this relation may be varied to meet different source frequencies and general timing requirements, the essential being that the triggering intervals provide sufficient "recovery time" to permit the spinning particles of the particular chemical sample to re-align themselves in the polarizing field following the echoes. Furthermore, while the method has been described in typical detail as applied to magnetic moments of spinning nuclei in a magnetic field, it will be evident to those skilled in the art that it may similarly be applied with electric moments of such nuclei in an electric field or moments of other spinning particles in suitable polarizing fields. Thus while the invention has been set forth in preferred form, it is not limited to the precise forms and procedures illustrated, as various modifications may be made without departing from the scope of the appended claims.

We claim:

1. In a spin echo memory process of storing information by establishing systematic precessional disassembly of related moments of spinning particles in an inhomogeneous polarizing field and subsequently recovering said information by systematic reassembly of said moments in said field, said process including orderly establishment of informational moment associations having a first essential time and field condition symmetry in said process and normally involving spurious moment associations having essential time and field condition symmetries differing from said first essential symmetry, that method of producing echoes solely from said informational moment associations which includes the steps of continuously varying said field condition in accord with said first essential symmetry and in disaccord with said other essential symmetries, whereby said spurious moment associations may be destroyed while said informational moment associations may progress to said systematic reassembly to form echo signals, and detecting said echo signals.

2. A method according to claim 1 wherein said memory process includes application of a torsional recollection pulse to said spinning particles for converting said systematic moment disassembly to said systematic reassembly, and wherein said field varying step includes continuously altering the inhomogeneity of said field in predetermined timed relationship to said recollection pulse and said orderly establishment of said informational moment associations.

3. A method according to claim 1 wherein said memory process includes initial application of a torsional pre-pulse to said spinning particles to condition the same for said establishment of said informational moment associations and further application of a torsional recollection pulse for converting said systematic moment disassembly to said systematic reassembly, and wherein said field varying step includes altering the inhomogeneity of said field with an asymmetrical wave form repeated in translationally symmetrical timed relationship to said pre-pulse and said recollection pulse.

4. A method according to claim 1 wherein said memory process includes initial application of a torsional pre-pulse to said spinning nuclei to condition the same for said establishment of said informational moment associations and further application of a torsional recollection pulse for converting said systematic moment disassembly to said systematic re-assembly, and wherein said field varying step includes altering the inhomogeneity of said field with an asymmetrical wave form repeated in translationally symmetrical timed relationship to said pre-pulse and said recollection pulse, said pre-pulse and said recollection pulse coinciding in time with corresponding low amplitude points of said repeated wave form.

5. A method according to claim 1 wherein said memory process includes application of a torsional recollection pulse to said spinning particles for converting said systematic moment disassembly to said systematic reassembly, and wherein said field varying step includes continuously altering the amplitude of inhomogeneity of said field in mirror symmetry about said recollection pulse.

6. In a spin-echo process of information storage and recovery by differential precession of gyromagnetic nuclei in an inhomogeneous magnetic field, including a recollection pulse and a series of prior information pulses requiring a predetermined time and field conditional symmetry respecting said recollection pulse for producing subsequent echoes of said information pulses, said process normally involving spurious inter-pulse echo formations having essential time and field conditional symmetries differing from said predetermined symmetry, that method of inhibiting said spurious echo formation which includes the steps of establishing a continuous variation in the inhomogeneity of said field, and applying said information and recollection pulses to said nuclei in a timed relation to said field variation in accord solely with said predetermined symmetry requirement.

7. In a spin-echo process of information storage and recovery by differential precession of gyromagnetic nuclei in an inhomogeneous magnetic field and including in sequence an applied pre-pulse, a plurality of applied information pulses, an applied recollection pulse, and a plurality of produced echo pulses corresponding to said information pulses, said sequence having a predetermined translational symmetry in time and field condition relationship between said pre-pulse and said information pulses and between said recollection pulse and said echo pulses, that method of eliminating spurious inter-pulse echo formations having time and field condition symmetry relationships differing from said predetermined symmetry, which includes the steps of establishing a continuous variation of the inhomogeneity condition of said field having repetitive time-amplitude waves of asymmetrical form, and inposing said pulse sequence in timed relationship to said waves of field variation in accordance with said predetermined translational symmetry.

8. A method according to claim 7 wherein said timed relationship includes coincidence of said pre-pulse and said recollection pulse with corresponding low points of said waves of field variation.

9. Apparatus for storing information in and subsequently extracting said information from a sample of chemical substance by nuclear induction comprising, in combination, means to establish a polarizing magnetic field through said sample to polarize gyromagnetic nuclei thereof, means to apply radio-frequency torsional information and control pulses to said gyromagnetic nuclei whereby said nuclei may precess to constructive magnetic interference to form spin echo pulses in a progression with said information and control pulses, means to impart a continuous variation in magnetic inhomogeneity to said field in predetermined timed relation to said pulses in said progression, and means to detect said echo pulses.

No references cited.